(12) United States Patent
Forster

(10) Patent No.: US 8,495,701 B2
(45) Date of Patent: Jul. 23, 2013

(54) INDEXING OF SECURITY POLICIES

(75) Inventor: Craig Robert William Forster, Southport (AU)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/133,850

(22) Filed: Jun. 5, 2008

(65) Prior Publication Data

US 2009/0307742 A1 Dec. 10, 2009

(51) Int. Cl.
*G06F 17/00* (2006.01)
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | |
|---|---|---|
| 2006/0225055 A1 | 10/2006 | Tieu |
| 2007/0056018 A1* | 3/2007 | Ridlon et al. .................. 726/1 |
| 2007/0156659 A1 | 7/2007 | Lim |
| 2007/0157288 A1 | 7/2007 | Lim |

OTHER PUBLICATIONS

Zhang, N., Ozsu, M., Ilyas, I., Aboulnaga, A., "FIX: Feature-based Indexing Technique for XML Documents," VLDB '06, Sep. 12-15, 2006, pp. 259-270.*
N. Zhang et al., "FIX: Feature-based Indexing Technique for XML Documents," Proceedings of the 32nd VLDB Conference, 2006, pp. 259-270.*
P. Ponniah, Data Warehousing Fundamentals, Wiley-Interscience, 2001, p. 275.*
Freeman, L., "Looking Beyond the Hype: Evaluating Data Deduplication Solutions," NetApp, Inc. White Paper, 2007, 11 pages.*
"equivalent," Webster's Third New International Dictionary, 1993, 2 pages.*
"redundant," Webster's Third New International Dictionary, 1993, 2 pages.*

* cited by examiner

*Primary Examiner* — Carl Colin
*Assistant Examiner* — John Elmore
(74) *Attorney, Agent, or Firm* — Yee & Associates, P.C.; John D. Flynn

(57) ABSTRACT

In one embodiment, a computer implemented method for indexing security policies is provided. The computer implemented method determines a policy vocabulary to form a set of policy elements, and creates an index from the set of policy elements. The computer implemented method further receives a request to form requested policy elements, locates requested policy elements in the index to form a set of returned policy elements, and identifies a rule for use with the returned policy elements.

18 Claims, 6 Drawing Sheets

| RULE NUM | AttributeId = subject-id | AttributeId = resource-id | AttributeId = action-id | Condition |
|---|---|---|---|---|
| 1 | Craig | /home/craig | * | - |
| 2 | Fiona | /home/fiona | * | - |
| 3 | Craig | /public | Read | - |
| 4 | Fiona | /public | Read | - |
| 5 | Kerry | * | * | Between 9 AM and 5 PM |

```xml
<Rule>
    <Target>
        <Subjects> /404                              400
            <Subject>
                <SubjectMatch MatchId="string-equals">
                    <AttributeValue Datatype="string">Craig</AttributeValue>
                    <SubjectAttributeDesignator Id="subject-id" />
                </SubjectMatch>
                <SubjectMatch MatchId="integer-greater-than"> /406
        410{        <AttributeValue DataType="integer">21</AttributeValue>
                    <SubjectAttributeDesignator Id="age" />
                </SubjectMatch>  ~408
            </Subject>
        </Subjects>
    </Target>
    <Condition>
        <Apply FunctionId="time-greater-than">
            <AttributeValue DataType="time">17:00:00</AttributeValue>
            <EnvironmentAttributeDesignator Id="current-time" />
        </Apply>
    </Condition>
</Rule>
```

Becomes:

```xml
<Rule Effect="Permit">
    <Target>                                          402
        <Subjects>
            <Subject>
                <SubjectMatch MatchId="string-equals">
                    <AttributeValue Datatype="string">Craig</AttributeValue>
                    <SubjectAttributeDesignator Id="subject-id" />
                </SubjectMatch>
            </Subject>
        </Subjects>
    </Target>
    <Condition> /412
        <Apply FunctionId="and">
            <Apply FunctionId="integer-greater-than"> /414
        418{    <AttributeValue DataType="integer">21</AttributeValue>
                <SubjectAttributeDesignator Id="age" />
        416/ </Apply>
            <Apply FunctionId="time-greater-than">
                <AttributeValue DataType="time">17:00:00</AttributeValue>
                <EnvironmentAttributeDesignator Id="current-time" />
            </Apply>
        </Apply>
    </Condition>
</Rule>
```

*FIG. 4*

| Key | Rule Num |
|---|---|
| [subject-id=Craig, resource-id=/home/craig] | 1 |
| [subject-id=Fiona, resource-id=/home/fiona] | 2 |
| [subject-id=Craig, resource-id=/public, action-id=read] | 3 |
| [subject-id=Fiona, resource-id=/public, action-id=read] | 4 |
| [subject-id=Kerry] | 5 |

FIG. 6

| Key | Rule Num |
|---|---|
| [subject-id=Craig, resource-id=/home/craig] | 1 |
| [subject-id=Fiona, resource-id=/home/fiona] | 1 |
| [subject-id=Craig, resource-id=/public, action-id=read] | 1 |
| [subject-id=Fiona, resource-id=/public, action-id=read] | 1 |
| [subject-id=Kerry] | 5 |

| Vocabulary Combination | Constructed Key | Rule Found |
|---|---|---|
| [subject-id, resource-id] | [subject-id=Craig, resource-id=/public] | - |
| [subject-id, resource-id, action-id] | [subject-id=Craig, resource-id=/public, action id=read] | 1 |
| [subject-id] | [subject-id=Craig] | - |

FIG. 9

| Index | Rule Id | Col1 | Col2 | Col3 |
|---|---|---|---|---|
| 0 | 1 | Craig | /home/craig | NULL |
| 1 | 1 | Fiona | /home/fiona | NULL |
| 2 | 1 | Craig | /public | read |
| 3 | 1 | Fiona | /public | read |
| 4 | 5 | Kerry | NULL | NULL |

INDEXING OF SECURITY POLICIES

BACKGROUND OF THE INVENTION

1. Field of the Invention

The present invention relates generally to an improved data processing system and more specifically to a computer implemented method, an apparatus, and a computer program product for indexing of security policies.

2. Description of the Related Art

The eXtensible Access Control Markup Language, or XACML, is an Organization for the Advancement of Structured Information Standards (OASIS) managed industry standard for managing access control policy. The industry standard is available from the OASIS web site at www.oasis-open.org. eXtensible Access Control Markup Language is an example of a context-based security language. In this example, an authorization request context is a set of attributes, such as the subject's login identifier, and the policy of the context is a set of rules that inspect the values in the context to reach a decision. In eXtensible Access Control Markup Language, these rules are nested in policy and policy set objects which can also be nested in turn.

A policy set, policy, and rule, or "policy element," are determined to be "applicable" to a request through a combination of functions that must evaluate to provide a response of "true." Each policy element can have multiple combinations of functions, but only one combination must be true for a policy to be applicable to the request. For example, a rule can be applicable to a request, in the form of, "if the subject is Craig AND if the resource is /foo, OR if the subject is Kerry AND the action is read, because the expression will evaluate to true.

This type of request representation is inefficient for runtime evaluation. Each combination of functions in the request must be evaluated, at run time, to determine the applicability of a policy element. The time required to evaluate the requests with respect to specific policies increases as the number of requests and number of policies increase. The evaluation time is directly related to the number of requests and policies. An individual request evaluation response time is also directly related to the number of functions within a policy being evaluated.

BRIEF SUMMARY OF THE INVENTION

According to one embodiment of the present invention, a computer implemented method for indexing security policies is provided. The computer implemented method determines a policy vocabulary to form a set of policy elements and creates an index from the set of policy elements. The computer implemented method receives a request to form requested policy elements, locates requested policy elements in the index to form a set of returned policy elements, and identifies a rule for the returned policy elements.

In another illustrative embodiment, a data processing system comprises a bus, a memory, connected to the bus, comprising computer-executable instructions, a communications unit connected to the bus, a display connected to the bus, and a processor unit connected to the bus. The processor unit executes the computer-executable instructions to direct the data processing system to: determine a policy vocabulary to form a set of policy elements, create an index from the set of policy elements, receive a request to form requested policy elements, locate requested policy elements in the index to form a set of returned policy elements, and identify a rule for the returned policy elements.

In yet another illustrative embodiment, a computer program product is provided. The computer program product comprising a computer-readable storage medium having computer-executable instructions embodied thereon. The computer-executable instructions comprising computer-executable instructions for determining a policy vocabulary to form a set of policy elements, computer-executable instructions for creating an index from the set of policy elements, computer-executable instructions for receiving a request to form requested policy elements, computer-executable instructions for locating requested policy elements in the index to form a set of returned policy elements, and computer-executable instructions for identifying a rule for the returned policy elements.

BRIEF DESCRIPTION OF THE SEVERAL VIEWS OF THE DRAWINGS

FIG. 4 is a block diagram of a code fragment showing modification of an inequality expression, in accordance with illustrative embodiments;

FIG. 6 is a block diagram a sample index created for the policy table of FIG. 5, in accordance with illustrative embodiments;

FIG. 7 is a block diagram of an optimized sample index of FIG. 6, in accordance with illustrative embodiments;

FIG. 8 is a block diagram of an index lookup example using a sample index of FIG. 7, in accordance with illustrative embodiments;

FIG. 9 is a block diagram of a sample database version of the sample index of FIG. 7, in accordance with illustrative embodiments;

DETAILED DESCRIPTION OF THE INVENTION

Figure 1:
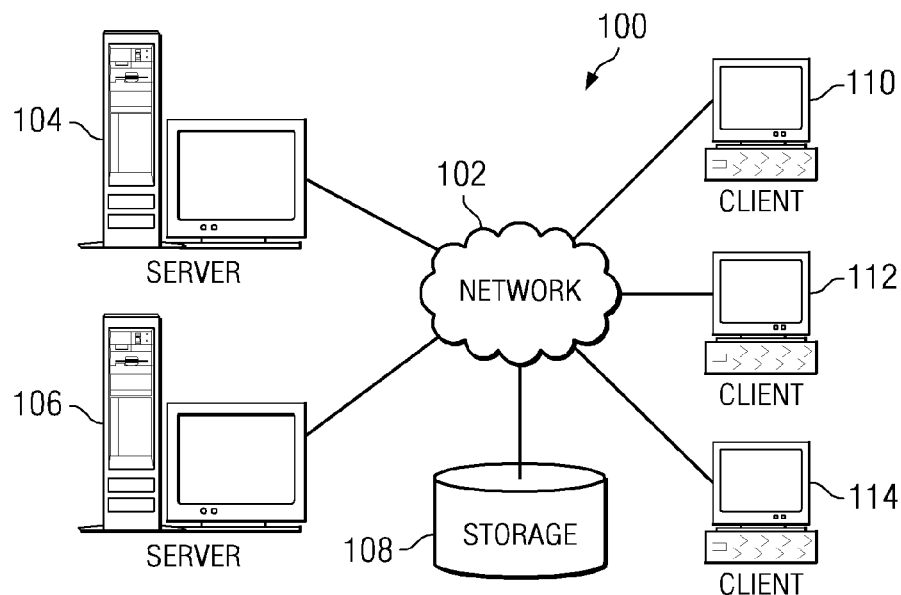
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable storage medium(s) may be utilized. The computer-usable or computer-readable storage medium may be, for example but not limited to, an electronic, magnetic, optical, or semiconductor system, apparatus, or device. More specific examples (a non-exhaustive list) of the computer-readable medium storage would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can store the program for use by or in connection with the instruction execution system, apparatus, or device. The computer-usable or computer-readable storage medium does not include a propagation medium, such as a propagated data signal or a carrier wave.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable storage medium that can direct a computer, or other programmable data processing apparatus, to function in a particular manner, such that the instructions stored in the computer-readable storage medium produce an article of manufacture, including instruction means, which implement the function/act specified in the flowchart and/or block diagram block or blocks.

The computer program instructions may also be loaded onto a computer or other programmable data processing apparatus to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

Figure 2:
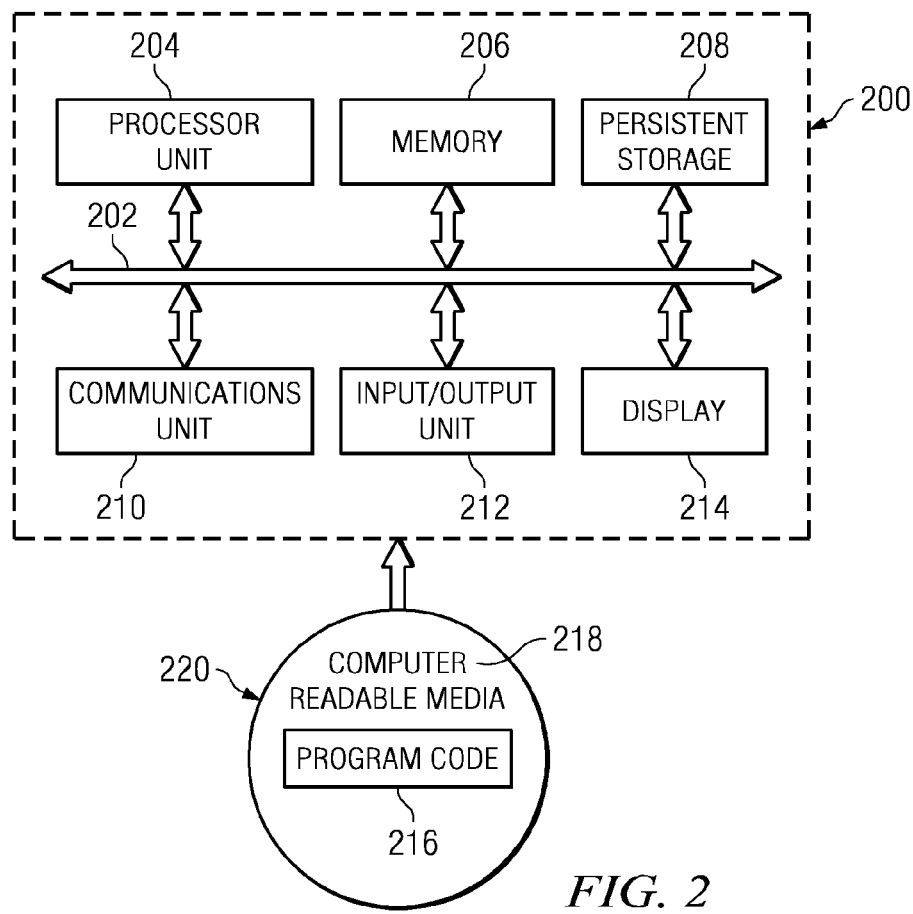
FIG. 2 is a block diagram of a data processing system is shown in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

According to one embodiment of the present invention, a method of indexing policy such that the policy element applicable to a given request can be quickly and efficiently determined is provided. Using the example system 100 of FIG. 1, a policy set located on server 104 may be used to control access to resources of the system. The policy set is reduced to a set of distinct rules, where each rule is applicable to only one request. An index is created for these distinct rules, where the key of the index is the combination of attribute values that must be present in the request for the rule to be applicable. The index creation can be performed by a user on client 110 through network 102 or on the server itself as well as by programmatic means. In order to ensure efficient lookups from the index, in constant time, all functions that do not involve equality checks are relocated to the condition portion of the rules. The indexing process typically allows large sets of security policy to be more efficiently evaluated by all clients and components of system 100, thereby improving the system operation.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-readable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figures 3, 5:
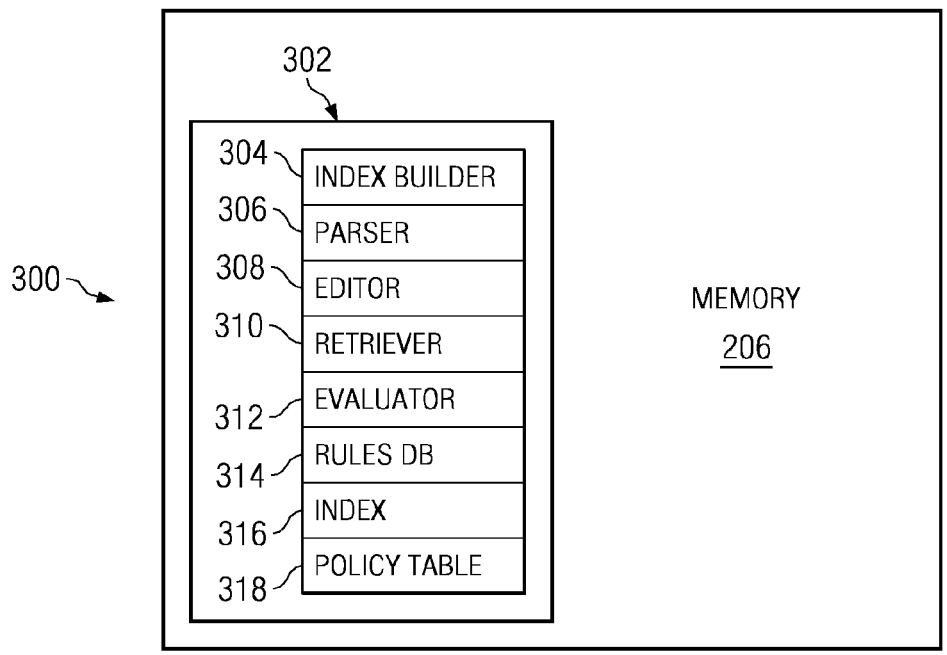
FIG. 3 is a block diagram of high level components of an policy evaluation manager, in accordance with illustrative embodiments.
FIG. 5 is a block diagram of a policy table example, in accordance with illustrative embodiments.

With reference to FIG. 3, a block diagram of high level components of a policy evaluation manager, in accordance with illustrative embodiments, is shown. Policy management configuration 300 is an example implementation of policy evaluation manager 302 within the context of data processing system 200 of FIG. 2. Policy evaluation manager 302 is shown within memory 206 of data processing system 200 of FIG. 2. Policy evaluation manager 302 may also be located within other memory locations until needed for use as desired. Other memory locations include persistent storage 208 of FIG. 2.

Policy evaluation manager 302 is comprised of a number of cooperating components to deliver effective evaluation of security policy related requests. The components typically comprise an index builder 304, a parser 306, an editor 308, a retriever 310, an evaluator 312, and a rules database (DB) 314. As stated, the components work in cooperation with one another, but also with other system-related components. Although shown as separate entities, the components may also be implemented as a collection of services within a common offering, or combined in other ways to achieve the same functional capability.

Index builder 304 provides a capability to produce keys based on values for rules for vocabulary elements. The key of the index is the combination of attribute values that must be contained in a request for the rule to be applicable. The key is therefore built from the attribute value combinations. The index key reduces the time required to determine an applicable policy element related to a request. A policy element is an attribute and value combination. For example, an attribute of "subject-id" and an associated value of "Craig" defines a policy element of "subject-id=Craig." A policy is then a set of policy elements that when evaluated with an associated condition may provide a single result. FIGS. 5 and 6 provide examples of policy elements comprising a policy as shown in rows of a table.

Parser 306 provides a parsing capability to analyze the requests, the rule information, and the policy vocabulary. The parser may be the same parser used to interpret the markup language used or may be specialized for additional tasks.

Editor 308 has a capability of creating, modifying and deleting rules, as well as policy elements. Editor 308 may be a typical text editor or other edit-capable component adapted to work with the data format chosen for the policy elements and rules implementation.

Retriever 310 fetches rules from a rules database or storage system as required for evaluation of a request. Retrieval may be for a list or set of candidate rules that are later evaluated. Rules may also be retrieved for subsequent processing by an editor.

Evaluator 312 provides a capability to examine rules provided in turn to determine a result. As stated previously, the result must return a "true" for the rule to be applicable.

Rules database (DB) 314 contains a set of rules. Rules are composed of a target portion and a condition portion. The target portion defines the subject or target of the rule. The condition portion defines criteria applicable to the target that must be met in combination with the subject for the rule to be true. For example, a rule for salary processing may have a target of "annual salary" and a condition portion of "less than 20,000."

Index 316 is a set of related keys obtained through the build process of index builder 304. The keys of index 316 represent an ordered list of corresponding policy elements. FIG. 6 provides an example index, in accordance with illustrative embodiments of the present invention.

Policy table 318 is a data structure comprising entries for the policy elements and rule identifiers. Each row in the data structure, when implemented as a table, contains a policy and a corresponding rule entry. The policy elements define the key. FIGS. 5 and 6 show the relationship between a policy table and an index for the policy table.

Preparing the policy for more efficient evaluation may be performed in a three-stage process comprising removal of "non-exact" matching functions from the target portion of the policy, determining the vocabulary of the policy, and mapping of each policy element requirement. Once an eXtensible Access Control Markup Language policy has been flattened by the process, the result is a set of policy elements that are distinct. Each rule is only applicable to one request. This applicability is determined by a combination of functions, such as "string-equals" and "integer-greater-than." The only restriction on the functions is that they must take two parameters as arguments and return a Boolean value.

The indexing process requires only equality functions are present in the target of the policy elements. This restriction ensures that an efficient set lookup can be performed rather than the sequential checking for matched values that is normally required by eXtensible Access Control Markup Language. In order to achieve this, the non-exact matching functions are moved from the target section of the rule to the condition section, or portion, of the rule, combined with any existing condition using a boolean "and" operator. The process may be seen in FIG. 4 and described next.

With reference to FIG. 4, a block diagram of a code fragment showing modification of an inequality expression in a rule, in accordance with illustrative embodiments is shown. The example depicts a definition for a rule using a policy element. The rule is contained within rules database 314 of FIG. 3. The policy elements are contained within policy table 318 of FIG. 3.

Code fragment 400 depicts subjects 404 tag introducing the subject descriptions within a target section of a rule. Subjectmatch 406 tag further defines a matching expression. The matching expression in this example is for an inequality. An attribute value is provided, in this case "21" as an integer. A subject attribute designator identifier is also provided as part of the triplet of statements. In this example, the identifier is "age." A corresponding end subjectmatch 408 tag indicates completion of the definition initiated by subjectmatch 406 tag. The grouping or code snippet 410 defines a conditional term of inequality.

Code fragment 402 depicts a transformation and relocation of code snippet 410. Subjectmatch 406 tag, and other statements defining the matching expression, and the corresponding end subjectmatch 408 tag have been transformed. Code snippet 410 has also been relocated from target, subjects 404, section to condition 412 section of the rule. Subjectmatch 406 tag has been changed to apply 414 tag while end subjectmatch 408 tag has been changed to end apply 416 tag. The transformation has created condition entry 418 rather than a subject entry. The inequality entry in the subject section of the rule has been removed so that the rule now has only an equality type of subject.

Once this process is complete for all flattened policy elements, the resulting policy may no longer be normalized—that is, a request may now have multiple applicable rules. The evaluation process is now split into two distinct phases. The first phase is to retrieve a list of candidate rules and the second phase is to evaluate each rule in turn until a result is obtained. An indexing algorithm is used to efficiently retrieve the candidate rules during runtime policy evaluation.

The vocabulary of the eXtensible Access Control Markup Language policy is the total set of attribute specifications that are relevant during indexing. In the example above, the vocabulary consists of only one attribute specification: the SubjectAttributeDesignator specifying the attribute "subject-id." The data type of the returned value is also taken into consideration. For example, a "subject-id" attribute of type "http://www.w3.org/2001/XMLSchema#string" is different than a "subject-id" attribute of type "urn:oasis:names:tc:xacml:1.0:datatypes:rfc822Name."

Once the vocabulary of the policy has been determined, an index is created based on values for the vocabulary elements in each rule. Not all elements of the vocabulary are used for each rule. The process considers the implied "don't care" semantics. The "don't care" semantics mean that for a given attribute specification, the policy element does not care what the assigned value is. Any assigned value is applicable for all values of the attribute.

An example different from the example in FIG. 4 may be for a rule that specifies a "subject-id" must be "Craig," while another rule may specify that the "resource-id" must be "/public." An indexing algorithm must take into account the fact that the first rule does not care about the value of the "resource-id" attribute, and vice versa. Typically, the "don't care" semantics in the examples are represented as wild card expressions using a symbol of '*' or other suitable indicia.

During runtime policy evaluation, the specified value for each element in the policy vocabulary is extracted from the runtime context. While taking into account the "don't care" semantics, a look-up of applicable policy elements is performed from the index. Because only equality checks are used in the lookup process, the lookup can be an efficient, hash-based lookup implemented in constant time. Once the applicable policy elements are retrieved, there may be more than one; each rule is evaluated in turn as described above.

In one exemplary embodiment, a Java® HashMap for the index is created, where the key is the set of concrete values for the rule, and the value is a unique identifier for the rule itself. At runtime, multiple queries into the index are performed to preserve the "don't care" semantics described above. To obtain the preservation, the fact that subsets of the policy will determine associated applicability on the same combinations of attribute identifiers is used. These different subsets are finite in number and hence, enable creation of multiple "keys" based on each of these combinations and query of the index for each key.

With reference to FIG. 5, a block diagram of a policy table example, in accordance with illustrative embodiments is shown. Policy table 500 is an example implementation of policy table 318 of FIG. 3. Policy table 500 is an example showing the typical type of information necessary and is not meant to limit the implementation to a particular embodiment. Column 502 labeled "rule num" lists the rule identifiers as simple numerals. Columns 504 depict the three attributeid-based representations of the rule. Column 506 contains the values for the condition section of the rule. The vocabulary of the policy as described in FIG. 5 is thus shown in columns 504 as instances of the attributeid having values of "[subject-id, resource-id, action-id]." However, there are three distinct combinations of this vocabulary that will be used to index: "[subject-id, resource-id]", "[subject-id, resource-id, action-id]", and "[subject-id]." Each row of the table forms a policy comprised of a set of policy elements. In this example, each policy is comprised of three attributeid elements and a condition element. Only condition element 510 is present.

Value 508 is an instance of a wildcard or "don't care" semantic. Condition element 510 depicts a string defining a time-based condition. Another column may be added to the right of column 506 to depict the effect of the rule. The effect of the rule can be either permit or deny. In this example, all the rules have permit effects, meaning if the rule is a match to the request, a single value of "permit" would be returned.

With reference to FIG. 6, a block diagram of a sample index created for the policy table of FIG. 5, in accordance with illustrative embodiments is shown. Sample index 600 is an example of an index built based on policy table 500 of FIG. 5. Sample index 600, shown in tabular form, comprises a combination of key 602 and rule number 604. Key element 606 depicts a combination of subject-id and resource-id entries concatenated together and assigned as a first rule 608. Key element 610 depicts a combination of subject-id, resource-id and action-id entries concatenated together and assigned as third rule 612. Key element 614 depicts a single element subject-id, and assigned as fifth rule 616. The corresponding entry in FIG. 5 shows both resource-id and action-id as wildcards and a condition value.

An optimization is performed to reduce the number of available rules that can be returned. As a number of attributes are evaluated during the indexing step, the same attributes do not have to be considered again during the subsequent step of evaluating found candidates. Therefore, these attributes can be removed from the rules and eliminate any redundant results.

This means that in the example of FIG. 6, the subject-id, resource-id and action-id are all being evaluated during the indexing step, and do not need to be considered again after determining candidate rules. Ignoring these parameters, it can be seen that rules numbered "1" through "4" are all equivalent. Rule number "5" is not equivalent as it contains a condition statement. Hence, rules "2" through "4" are deemed to be "redundant" and the index for these rows can be updated to simply point to rule "1."

With reference to FIG. 7, a block diagram of an optimized sample index of FIG. 6, in accordance with illustrative embodiments is shown. Optimized sample index 700 is an optimized example of sample index 600 of FIG. 6 and includes two portions comprising key 702 and rule number 704 portions. Keys 706, while unique, now all have the same rule number as indicated by element 708. Key 710 has a corresponding rule number of element 712. Rule numbers for keys 706 have been changed from sequential numbers "1" through "4" into a single "1." Optimization has eliminated the need for rules "2" through "4."

A runtime evaluation of this policy against an incoming request can now be performed. When the incoming request specifies subject-id Craig is attempting to perform a read action-id on resource-id /public, then the following index lookups will be performed with the associated result. Each distinct combination of the vocabulary is used in turn to construct a key into the index. This results in three lookups as shown in FIG. 8.

With reference to FIG. 8, a block diagram of an index lookup example using a sample index of FIG. 7, in accordance with illustrative embodiments is shown. Sample index lookup 800 is an example of resolving a request using optimized index 700 of FIG. 7 to provide a series of lookups. Sample index lookup 800 depicts, in tabular form, a relationship between vocabulary combination 802, constructed key 804 and rule found 806. Element 808 depicts the two attribute identifiers forming the vocabulary combination of a first entry. Corresponding rule 810 is shown as a dash indicating a rule does not exist. Element 812 depicts the three attribute identifiers forming the vocabulary combination of a second entry. Corresponding rule 814 is shown as "1," indicating that rule "1" is applicable in this case.

There is also one more possible index key that may be considered, and that is the empty key "[ ]." For this example, this key returns no values. Our only candidate rule for this request is therefore rule "1."

Once candidate rules have been identified, the rules can each be evaluated in the original order the rules appear in the policy to determine a result. For this example, rule "1" has no attached condition elements, so assuming the effect of the rule is "permit," a response of "permit" can be returned for this request.

In another exemplary implementation, a database may be used. The key of the database may then become a unique identifier for each rule, and each column may be mapped to a specific attribute identifier. The value of each of these columns is either the specific value of the attribute identifier required, or a "NULL" value indicating that any value may be used in "don't care" or wildcard case. At runtime, a SQL query is constructed based upon data in the request. The query retrieves the identifiers of the applicable rule for subsequent evaluation. The process is much the same as above, including the step of removing redundant rules.

With reference to FIG. 9, a block diagram of a sample database version of the sample index of FIG. 7, in accordance with illustrative embodiments is shown. Database table 900 is a database representation of optimized index 700 of FIG. 7, depicting the optimized index as a database entry. Column 902 is the index value from the database. The database index value should be the same as the other example to ensure the rules are handled in the same manner. Column 904 provides the rule identifier value. Column 906 represents the subject-id. Column 908 represents the resource-id and column 910 represents the action-id. Elements 912 represent the database keys of the index maintaining the order as in optimized index 700 of FIG. 7.

The columns are named using a "col#" identifier rather than "subject-id" as there is the possibility that the string identifier for an attribute will be longer than the allowed length for a database column name. A schema definition may be used to keep track of the fact that "subject-id" values should be placed in "col1" and similar entries for other columns.

In order to find the list of candidate rules, an SQL query is constructed. Given the same example request as FIG. 8, the SQL query will be as follows:

SELECT RULEID FROM <TABLE> WHERE (COL1='Craig' OR COL1 IS NULL) AND (COL2='/public' OR COL2 IS NULL) AND (COL3='read' OR COL3 IS NULL) ORDER BY INDEX. The query returns the "RuleId" having a value '1', which is the same applicable rule as in the sample shown in FIG. 7.

Figure 10:
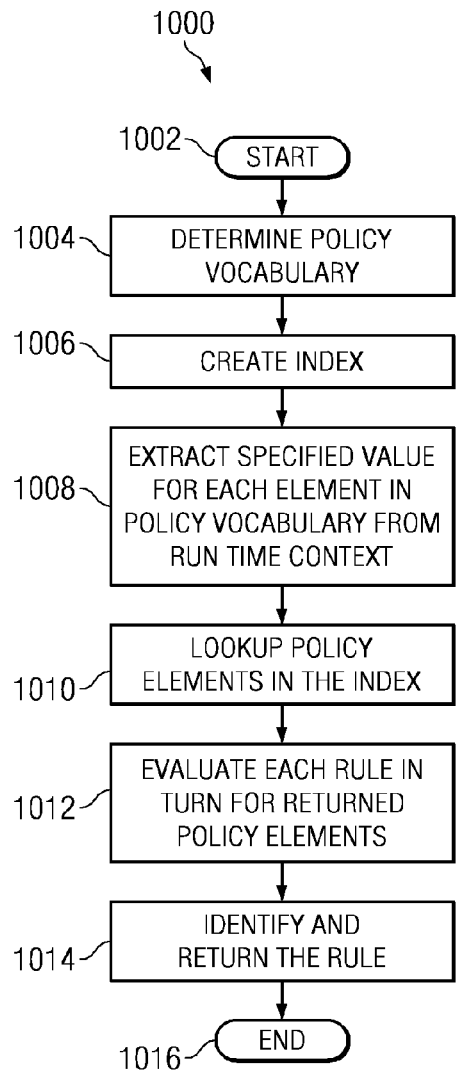
FIG. 10 is a flowchart of a policy evaluation in accordance with illustrative embodiments.

With reference to FIG. 10, a flowchart of a policy evaluation in accordance with illustrative embodiments is shown. Process 1000 is an example showing use of the policy evaluation manager 302 of FIG. 3.

Process 1000 starts (step 1002) and determines policy vocabulary (step 1004). Vocabulary is determined by examination of the elements of the rules with respect to values used for the attribute identifiers. An example of the data examined is shown in FIG. 5. Having determined the applicable vocabulary, a create index operation is performed (step 1006). The index values are created using the combinations of attribute identifiers.

Extraction of specified values for each element in a policy vocabulary of a run time context, is performed (step 1008). The run time context is the request. The extraction pulls the policy elements, including values, out of the request for processing. Having obtained the values, a lookup of policy elements in the index is performed (step 1010). As described before, the policy vocabulary elements are compared with the keys of the index to determine applicable rules. Each distinct combination of the policy elements is used as a key into the index.

The lookup of step 1010 provides a set of candidate rules. Evaluate each rule, in turn, for returned policy elements is performed (step 1012). A determination of the applicable rule is based on the suitability of the incoming request values compared with the index keys to identify a rule and return the rule (step 1014). Process 1000 terminates thereafter (step 1016).

Figure 11:
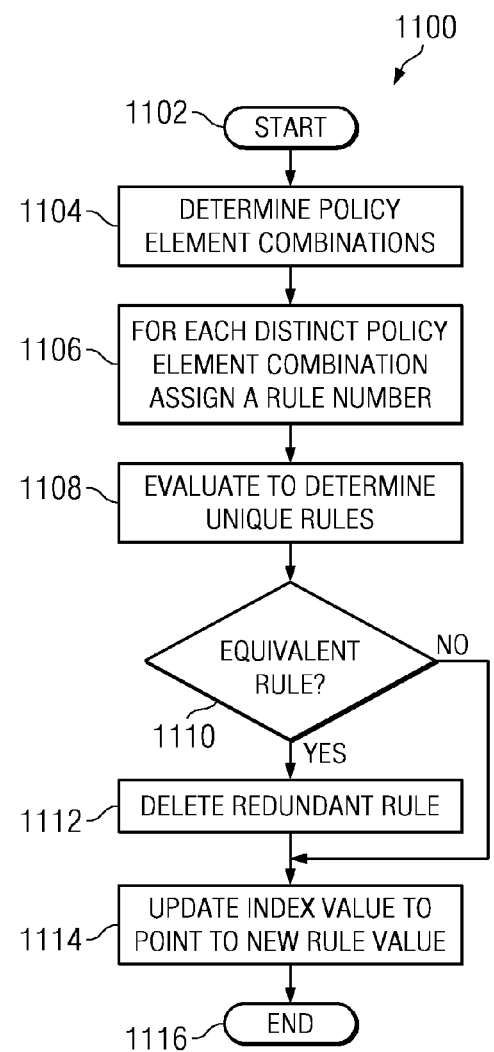
FIG. 11 is a flowchart of index building in accordance with illustrative embodiments.

With reference to FIG. 11, a flowchart of index building in accordance with illustrative embodiments is shown. Process 1100 is an example of a process used when creating an index by index builder 304 of policy evaluation manager 302 of FIG. 3.

Process 1100 starts (step 1102) and determines policy element combinations (step 1104). Each distinct policy element combination forms an entry for processing. For each distinct policy element combination, assign a rule number (step 1106). Evaluate the entries to determine unique rules (step 1108). Individual rules are listed for later examination according to uniqueness of policy elements. A determination is made as to whether a rule is equivalent to another rule (step 1110). Rules are equivalent when the similar input produces a corresponding similar output. Similar input implies similar vocabulary elements. When an equivalent rule is determined, a "yes" result is obtained. When no equivalent rule is determined, a "no" result is obtained.

When a "no" is obtained in step 1110, process 1100 skips to step 1114. When a "yes" is obtained in step 1110, a delete redundant rule is performed to remove the unnecessary rule from the set of rules (step 1112). An update of the index value to point to the new rule value completes the build for the current entry (step 1114). Process 1100 terminates thereafter (step 1116).

In one illustrative embodiment, a method of indexing policy such that the policy element applicable to a given request can be quickly and efficiently determined is provided. The policy is reduced to a set of distinct rules, where each rule is applicable to only one request. An index is created for these distinct rules, where the key of the index is the combination of attribute values that must be present in the request for the rule to be applicable. In order to ensure efficient lookups from the index in constant time, all functions that do not involve equality checks are located in the condition portion of the rule. This indexing process typically allows large sets of security policy to be more efficiently evaluated. A request is received containing policy elements. The request is handled so that the policy elements are resolved through an index look-up to a rule for the set of policy elements. The rule is then evaluated for the policy elements. Illustrative embodiments typically reduce the complexity of and different forms of expressions that must be evaluated to determine an applicable rule. The indexing described provides a more efficient mechanism to determine applicability of a rule for a given policy. The improvement typically reducing time spent in the processing of the request The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more computer-executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step-plus-function elements in the claims below, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by, or in connection with, a computer or any instruction execution system. For the purposes of this description, a computer-usable or computer-readable storage medium can be any tangible apparatus that can store, the program for use by or in connection with the instruction execution system, apparatus, or device.

The computer-usable or computer-readable storage medium can be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk— read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for indexing security policies, the computer implemented method comprising:
determining, by a computer, a policy vocabulary to form a set of policy elements;
creating, by the computer, an index from the set of policy elements, wherein creating the index from the set of policy elements comprises:
determining, by the computer, policy element combinations to form determined policy element combinations;
assigning, by the computer, a rule number to each distinct policy element combination within the determined policy element combinations to create a set of rules, wherein each rule in the set of rules includes a target portion and a condition portion;
removing, by the computer, inequality expressions located in subject entries of the target portion of the set of rules;
placing, by the computer, the inequality expressions removed from the target portion into the condition portion of the set of rules;
transforming, by the computer, each of the inequality expressions removed from the target portion and placed in the condition portion of the set of rules from a subject entry to an apply entry;
responsive to determining that two or more rules having distinct policy element combinations in the set of rules are equivalent, assigning, by the computer, a same rule number to each of the two or more rules having the distinct policy element combinations determined to be equivalent;
receiving, by the computer, a request to form requested policy elements;
locating, by the computer, requested policy elements in the index to form a set of returned policy elements; and
identifying, by the computer, a rule for the set of returned policy elements.

2. The computer implemented method of claim 1 wherein the target portion defines a target of the rule, and wherein the condition portion defines criteria applicable to the target that must be met in order to satisfy the rule.

3. The computer implemented method of claim 1 wherein determining whether unique rules are present in the set of rules comprises evaluating, by the computer, each rule in the set of rules with respect to vocabulary element combinations.

4. The computer implemented method of claim 1 wherein the index comprises a key portion and a rule number portion, and wherein each key portion comprises a distinct policy element combination.

5. The computer implemented method of claim 1 wherein receiving the request to form the requested policy elements further comprises extracting, by the computer, a specified value for each element in the policy vocabulary from a run time context.

6. The computer implemented method of claim 1 wherein identifying the rule further comprises evaluating, by the computer, each rule, in turn, for the set of returned policy elements.

7. A computer system for indexing security policies, the computer system comprising:
a bus;
a storage device connected to the bus, wherein the storage device stores computer-executable instructions; and
a processor unit connected to the bus, wherein the processor unit executes the computer-executable instructions to direct the computer system to:
determine a policy vocabulary to form a set of policy elements;

create an index from the set of policy elements, wherein creating the index from the set of policy elements comprises:
    determining policy element combinations to form determined policy element combinations;
    assigning a rule number to each distinct policy element combination within the determined policy element combinations to create a set of rules, wherein each rule in the set of rules includes a target portion and a condition portion;
    removing inequality expressions located in subject entries of the target portion of the set of rules;
    placing the inequality expressions removed from the target portion into the condition portion of the set of rules;
    transforming each of the inequality expressions removed from the target portion and placed in the condition portion of the set of rules from a subject entry to an apply entry;
    responsive to determining that two or more rules having distinct policy element combinations in the set of rules are equivalent, assigning a same rule number to each of the two or more rules having the distinct policy element combinations determined to be equivalent;
receive a request to form requested policy elements;
locate requested policy elements in the index to form a set of returned policy elements; and
identify a rule for the set of returned policy elements.

8. The computer system of claim 7 wherein the target portion defines a target of the rule, and wherein the condition portion defines criteria applicable to the target that must be met in order to satisfy the rule.

9. The computer system of claim 7 wherein executing the computer-executable instructions to determine whether unique rules are present in the set of rules directs the computer system to evaluate each rule in the set of rules with respect to vocabulary element combinations.

10. The computer system of claim 7 wherein the index comprises a key portion and a rule number portion, and wherein each key portion comprises a distinct policy element combination.

11. The computer system of claim 7 wherein executing the computer-executable instructions to receive the request to form the requested policy elements directs the computer system to extract a specified value for each element in the policy vocabulary from a run time context.

12. The computer system of claim 7 wherein executing the computer-executable instructions to identify the rule further directs the computer system to evaluate each rule, in turn, for the set of returned policy elements.

13. A computer program product for indexing security policies, the computer program product comprising a computer-readable storage medium having computer-executable instructions embodied thereon, the computer-executable instructions comprising:

computer-executable instructions for determining a policy vocabulary to form a set of policy elements;
computer-executable instructions for creating an index from the set of policy elements, wherein creating the index from the set of policy elements comprises:
determining policy element combinations to form determined policy element combinations;
assigning a rule number to each distinct policy element combination within the determined policy element combinations to create a set of rules, wherein each rule in the set of rules includes a target portion and a condition portion;
removing inequality expressions located in subject entries of the target portion of the set of rules;
placing the inequality expressions removed from the target portion into the condition portion of the set of rules;
transforming each of the inequality expressions removed from the target portion and placed in the condition portion of the set of rules from a subject entry to an apply entry; responsive to determining that two or more rules having distinct policy element combinations in the set of rules are equivalent, assigning a same rule number to each of the two or more rules having the distinct policy element combinations determined to be equivalent;
computer-executable instructions for receiving a request to form requested policy elements;
computer-executable instructions for locating requested policy elements in the index to form a set of returned policy elements; and
computer-executable instructions for identifying a rule for the set of returned policy elements.

14. The computer program product of claim 13 wherein the target portion defines a target of the rule, and wherein the condition portion defines criteria applicable to the target that must be met in order to satisfy the rule.

15. The computer program product of claim 13 wherein computer-executable instructions for determining whether unique rules are present in the set of rules comprises computer-executable instructions for evaluating each rule in the set of rules with respect to vocabulary element combinations.

16. The computer program product of claim 13 wherein the index comprises a key portion and a rule number portion, and wherein each key portion comprises a distinct policy element combination.

17. The computer program product of claim 13 wherein the computer-executable instructions for receiving the request to form the requested policy elements further comprises computer-executable instructions for extracting a specified value for each element in the policy vocabulary from a run time context.

18. The computer program product of claim 13 wherein the computer-executable instructions for identifying the rule further comprises computer-executable instructions for evaluating each rule, in turn, for the set of returned policy elements.

* * * * *